(12) United States Patent
Toledo et al.

(10) Patent No.: US 10,523,507 B2
(45) Date of Patent: Dec. 31, 2019

(54) METHOD AND SYSTEM FOR TUNING PERFORMANCE OF MICROSERVICES-BASED APPLICATIONS

(71) Applicant: Nirmata, Inc., San Jose, CA (US)

(72) Inventors: Damien Toledo, San Jose, CA (US); Jamsheed Bugwadia, San Jose, CA (US); Yun Qin, San Jose, CA (US)

(73) Assignee: Nirmata, Inc., San Jose, CA (US)

( * ) Notice: Subject to any disclaimer, the term of this patent is extended or adjusted under 35 U.S.C. 154(b) by 132 days.

(21) Appl. No.: 15/964,074

(22) Filed: Apr. 27, 2018

(65) Prior Publication Data

US 2018/0331905 A1 Nov. 15, 2018

Related U.S. Application Data

(60) Provisional application No. 62/504,727, filed on May 11, 2017.

(51) Int. Cl.
*H04L 12/24* (2006.01)
*H04L 12/26* (2006.01)

(52) U.S. Cl.
CPC ........ *H04L 41/0816* (2013.01); *H04L 41/083* (2013.01); *H04L 41/0886* (2013.01); *H04L 41/5025* (2013.01); *H04L 43/026* (2013.01); *H04L 43/0876* (2013.01); *H04L 43/0882* (2013.01); *H04L 41/147* (2013.01); *H04L 41/16* (2013.01); *H04L 41/22* (2013.01);
(Continued)

(58) Field of Classification Search
CPC ....... H04L 41/00; H04L 41/08; H04L 41/083; H04L 41/0816; H04L 41/0886; H04L 41/14; H04L 41/147; H04L 41/16; H04L 41/22; H04L 41/50; H04L 41/5025; H04L 43/00; H04L 43/02; H04L 43/026; H04L 43/06; H04L 43/067; H04L 43/08; H04L 43/0852; H04L 43/0876; H04L 43/0882; H04L 43/10; H04L 43/12; G06F 11/00; G06F 11/30
See application file for complete search history.

(56) References Cited

U.S. PATENT DOCUMENTS 6,574,195 B2  6/2003 Roberts
6,816,903 B1  11/2004 Rakoshitz et al.
7,012,919 B1  3/2006 So et al.
(Continued)

*Primary Examiner* — Tauqir Hussain
*Assistant Examiner* — Boris D Grijalva Lobos
(74) *Attorney, Agent, or Firm* — Kanika Radhakrishnan; Evergreen Valley Law Group

(57) ABSTRACT

Method and a server system for tuning a performance of an application are disclosed. A plurality of traffic flows associated with user requests related to the application are monitored for a predefined sampling period. A traffic flow associated with a highest total volume of communication is identified from among the plurality of traffic flows. The identified traffic flow is used for selecting corresponding flow segments in a decreasing order of respective individual volume of communication. For each selected flow segment, a pair of microservice instances is identified. It is determined whether at least one microservice instance is capable of being relocated from a respective current host to another host for achieving at least one predetermined performance objective. A redeployment of the at least one microservice instance is facilitated if the at least one microservice instance is capable of being relocated from the current host to another host.

20 Claims, 8 Drawing Sheets

(52) U.S. Cl.
CPC ........ *H04L 43/067* (2013.01); *H04L 43/0852* (2013.01); *H04L 43/12* (2013.01)

(56) References Cited

U.S. PATENT DOCUMENTS 9,270,559 B2    2/2016    Raleigh et al.
9,774,509 B1    9/2017    Ybarra, III

METHOD AND SYSTEM FOR TUNING PERFORMANCE OF MICROSERVICES-BASED APPLICATIONS

TECHNICAL FIELD

The present disclosure relates to applications implementing microservices architecture and, more particularly, to a method and system for tuning performance of applications implementing microservices architecture.

BACKGROUND

Applications based on microservices architecture, also referred to herein as microservices-based applications, are becoming increasingly popular. In such architecture, an application is broken down into independently deployable, small, modular services in which each service runs a unique process and communicates through a well-defined, lightweight mechanism to serve a business purpose. These independently deployable modular services are referred to herein as 'microservices'. In effect, a microservice is an application with a single function, such as routing network traffic, making an online payment or checking inventory. Each microservice is stateless and has multiple instances for availability and scale, so it is possible to stop and redeploy individual instances of a microservice without impacting the overall application.

Typically, logic for each microservice, or more specifically the logic for each microservice instance, is encapsulated in a software package generally referred to as a container. The container provides the necessary environment including code, runtime, system tools, system libraries, etc. for the microservice instance to run. In a containerized application, each microservice instance runs in its own container, and several containers can share a common pool of hosts. The containers can be from the same application, or from different applications. The containers provide fast deployment times, typically in milliseconds once the microservice image is downloaded and cached on a container host. Such combination of stateless services deployed in containers, enables rapid and dynamic adjustment of the application.

Generally, the deployment of microservice instances in hosts is based on an initial set of constraints such as CPU shares required, memory required, disk space required, affinity or anti-affinity with other microservice instances, etc. As such, defining valid constraints involves time consuming experimentations and, in many cases, also guesswork. The constraints are typically evaluated during initial deployment of microservice instances in hosts. In many example environments, such as for example in cloud environments, resources are shared across several services and applications and it is fairly common to run hundreds of microservices, each with three or more instances, across hundreds of container hosts. In such a scenario, the deployment of microservice instances based on the initial set of constraints may lead to sub-optimal application performance overtime, due to variations in underlying systems and variations in usage patterns. The sub-optimal distribution of microservices may also cause an increase in network latencies. As a result, the application needs to be tuned for improved performance over time. The tuning of performance may also be necessary when other services are redeployed, and/or when new infrastructure becomes available.

Typically, the tuning of performance is performed manually as automated tools for performance tuning lack the ability to understand how the microservice instance of one microservice communicates with microservice instances of other microservices. The manual tuning of performance requires considerable skill and substantial time and effort. Moreover, the tuning of performance is currently performed solely based on static affinity rules, which do not account for variations in traffic patterns and changes to the system behaviors over time, leading to over-provisioning of resources and higher costs.

Accordingly, there is a need to facilitate tuning of the performance of microservices-based application to achieve optimum performance. Moreover, there is a need to automatically tune the performance of the application as and when required, while precluding human intervention.

SUMMARY

Various embodiments of the present disclosure provide methods, systems, and electronic devices for tuning performance of microservices-based applications.

In an embodiment, a method for tuning a performance of an application is disclosed. The application includes a plurality of microservices. Each microservice is associated with one or more microservice instances. Each microservice instance is deployed on a host from among a plurality of hosts. The method includes, monitoring a plurality of traffic flows associated with user requests related to the application. The plurality of traffic flows is monitored by a server system for a predefined sampling period in response to a trigger event. Each traffic flow is associated with a respective total volume of communication among microservice instances in response to a user request. Each traffic flow includes at least one flow segment. The method includes identifying, by the server system, a traffic flow associated with a highest total volume of communication from among the plurality of traffic flows. The method includes selecting one or more flow segments corresponding to the identified traffic flow. The one or more flow segments are selected in a decreasing order of respective individual volume of communication by the server system. The method includes performing, by the server system for each selected flow segment, identifying a pair of microservice instances associated with the flow segment and determining if at least one microservice instance from among the pair of microservice instances is capable of being relocated from a respective current host to another host for achieving at least one predetermined performance objective. The method includes facilitating a redeployment of the at least one microservice instance if the at least one microservice instance is capable of being relocated from the current host to another host for achieving the at least one predetermined performance objective.

In another embodiment, a server system for tuning a performance of an application is disclosed. The application includes a plurality of microservices. Each microservice is associated with one or more microservice instances. Each microservice instance is deployed on a host from among a plurality of hosts. The server system includes at least one processing module and a memory having stored therein machine executable instructions. The stored machine executable instructions when executed by the at least one processing module cause the server system to monitor a plurality of traffic flows associated with user requests related to the application. The plurality of traffic flows is monitored for a predefined sampling period in response to a trigger event. Each traffic flow is associated with a respective total volume of communication among microservice instances in response to a user request. Each traffic flow includes at least one flow segment. The server system is caused to identify a traffic flow associated with a highest total volume of communication from among the plurality of traffic flows. The server system is caused to select one or more flow segments corresponding to the identified traffic flow. The one or more flow segments are selected in a decreasing order of respective individual volume of communication for the identified traffic flow. The server system is caused to perform for each selected flow segment, identifying a pair of microservice instances associated with the flow segment and determining if at least one microservice instance from among the pair of microservice instances is capable of being relocated from a respective current host to another host for achieving at least one predetermined performance objective. The server system is caused to facilitate a redeployment of the at least one microservice instance if the at least one microservice instance is capable of being relocated from the current host to another host for achieving the at least one predetermined performance objective.

In yet another embodiment, a method for tuning a performance of an application is disclosed. The application includes a plurality of microservices. Each microservice is associated with one or more microservice instances. Each microservice instance is deployed on a host from among a plurality of hosts. The method includes, monitoring a plurality of traffic flows associated with user requests related to the application. The plurality of traffic flows is monitored by a server system for a predefined sampling period in response to a trigger event. Each traffic flow is associated with a respective total volume of communication among microservice instances in response to a user request. Each traffic flow includes at least one flow segment. The method includes identifying, by the server system, a traffic flow associated with a highest total volume of communication from among the plurality of traffic flows. The method includes selecting one or more flow segments corresponding to the identified traffic flow. The one or more flow segments are selected in a decreasing order of respective individual volume of communication by the server system. The method includes performing, by the server system for each selected flow segment, identifying a pair of microservice instances associated with the flow segment and determining if the pair of microservice instances is capable of being collocated on a single host from among the plurality of hosts for achieving at least one predetermined performance objective. The method includes determining if the pair of microservice instances is capable of being relocated to a host pair with least latency subsequent to determining that the pair of microservice instances is incapable of being collocated on the single host. The method includes facilitating a redeployment of the at least one microservice instance based on the determination of relocation of the pair of microservice instances for achieving the at least one predetermined performance objective.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

Figure 1:
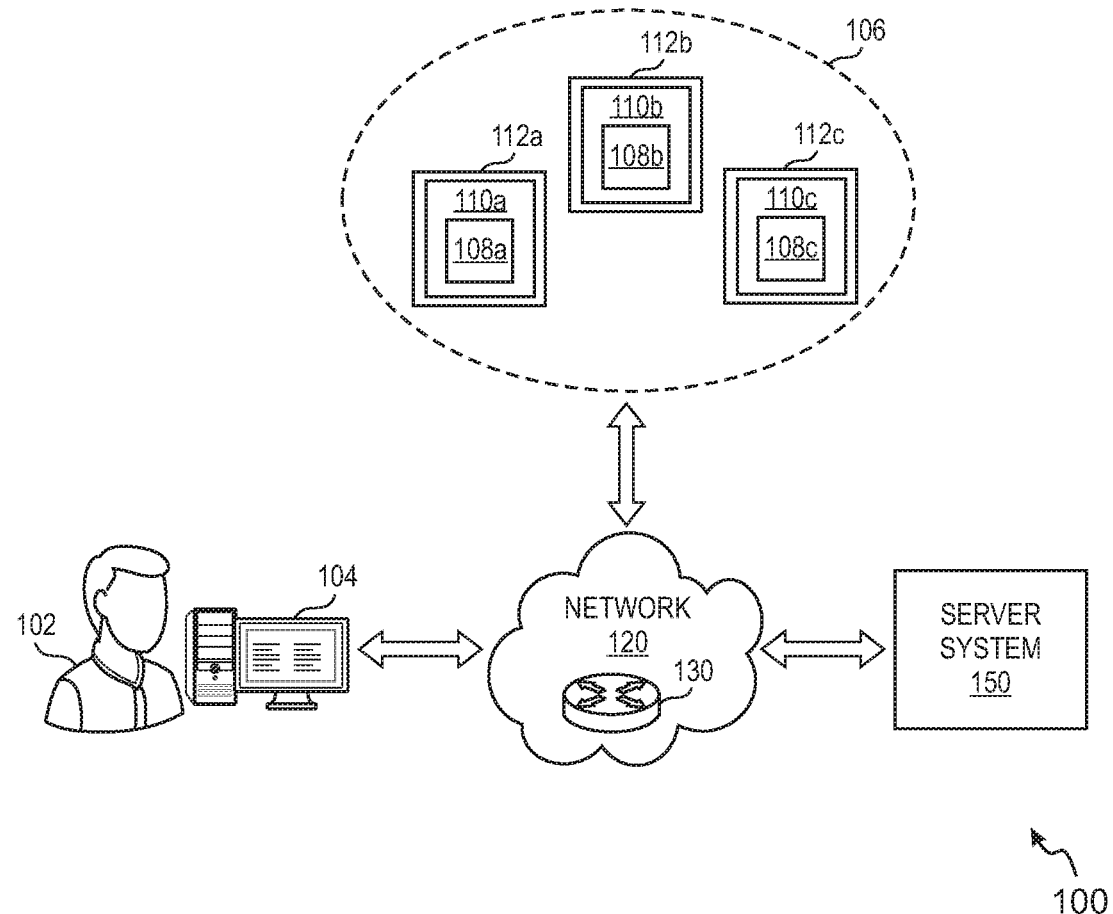
FIG. 1 illustrates a simplified representation of an environment in which various embodiments of the present invention may be practiced.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

The microservices architecture involves breaking down a monolithic application into independently deployable, small, modular services. Each independently deployable modular service, referred to herein as a 'microservice', is configured to perform a single function, such as routing network traffic, making an online payment or checking inventory. Each microservice is stateless and has multiple instances for availability and scale, so it is possible to stop and redeploy individual instances of a microservice without impacting the overall application.

Typically, the logic for each microservice instance is encapsulated in a software package generally referred to as a container, which provides the necessary runtime environment for the microservice instance to be executed. The containers are deployed in hosts and several containers can share a common pool of hosts. The deployment of a microservice instance in a host is based on constraints like CPU/memory/disk space required by the microservice instance, affinity or anti-affinity with other microservice instances deployed in the host, etc., which are typically defined at time of deployment of the microservice instance.

However, overtime, the placement of microservice instances in hosts may be sub-optimal due to variations in underlying systems and variations in usage patterns. Accordingly, the performance of the microservices-based application needs to be tuned to achieve optimal performance. The term 'tuning of performance of an application' as used herein implies ensuring microservices or, more specifically microservice instances, are deployed in a manner that reduces the volume of communication, while also taking care of the network latencies between hosts, thereby raising a performance of the microservices-based application to its optimum level.

Tuning a performance of a microservices-based application is generally performed manually as the automated tools lack the understanding of how the microservice instances communicate with each other. Such tuning of the performance involves manual evaluation of the constraints associated with deployment of microservice instances in hosts and moving the microservice instances from one host to another. In addition to being error-prone, the manual tuning of performance requires considerable skill and involves sizable time and effort. Moreover, the manual tuning of performance does not take into account all the constraints for tuning the performance of the application. For example, only static affinity related rules are currently considered during manual tuning of performance of the application. However, several factors like resource requirement, latency between hosts, etc., are not taken into consideration during manual tuning of performance of the application.

Various embodiments of the present invention suggest techniques that are capable of overcoming the above challenges and providing additional advantages. More specifically, embodiments of the present invention provide a method and system for tuning performance of applications implementing microservices architecture.

In many example scenarios, a user request for a service from an application may result in a series of cascaded HTTP requests/responses between microservice instances. For example, a user request may result in a microservice instance S1 deployed on Host H1 communicating with a microservice instance S2 deployed on Host H2, which in turn may communicate with a microservice instance S3 deployed on Host H3. The communication between individual microservice instances may be in form of HTTP requests and HTTP responses. The series of cascading HTTP requests/responses between microservice instances is referred to herein as a 'traffic flow' or 'flow'. Each traffic flow includes one or more flow segments, such as for example, in the above example, traffic flow between microservice instances S1, S2 and S3 involve flow segments corresponding to flow of communication between S1 and S2, S2 and S3, S3 and S2, and S2 and S1.

In an embodiment, a server system of the present invention is configured to monitor the total volume of communication in bytes for each traffic flow in a given time frame. For example, volume of all communication associated with each traffic flow in a predefined sampling period (for example, a day or in one-hour period) may be monitored. Moreover, the server system also measures baseline latencies across hosts in milliseconds. In one embodiment, the server system identifies the traffic flow with the highest total volume of communication for performing tuning. For tuning the traffic flow with the highest total volume of communication, individual flow segments within the traffic flow are tuned in the order of decreasing respective individual volume of communication. For tuning individual flow segments, it is determined whether the two microservice instances of the flow segment can be collocated on the same host. If the two microservice instances cannot be collocated on the same host, then it is determined whether the two microservice instances can be moved to a host pair with the lowest latency. The microservices are then deployed in a manner that reduces the volume of communication associated with the traffic flow, while also taking care of the network latencies between hosts, thereby tuning a performance of the microservices-based application to its optimum level. Moreover, the redeployment of microservices in hosts based on the observed traffic flows is performed automatically without any manual intervention. The tuning of performance of the microservices-based application is explained in further detail with reference to FIGS. 1 to 8.

FIG. 1 illustrates a simplified representation of an environment 100 in which various embodiments of the present invention may be practiced. The environment 100 depicts a user 102 associated with an electronic device 104. The environment 100 further depicts an application 106 implementing microservices architecture. Such an application is also referred to herein as microservices-based application. More specifically, the application 106 is decomposed into several independent functional units, referred to herein as microservices, such as microservice 108a, 108b and 108c. It is noted that each microservice is stateless and has multiple instances for availability and scale. Accordingly, the microservice 108a, 108b and 108c as shown in FIG. 1, actually correspond to a single instance of the respective microservice. For purposes of this example, the term 'microservice' as used herein implies a microservice instance.

In an illustrative example, the application 106 may correspond to an e-commerce application. Such an application may be decomposed into independent functional units such as taking an order, checking order, tracking a shipment, and the like. Accordingly, each such function may be executed as a microservice. It is understood that a user request for a service from the application may involve the use of several microservices. For example, if the user 102 wants to check the status of a shipment, then microservices related to identifying the consignment number, tracking a current location of the consignment, predicting a delivery time based on the tracked location, and the like, may be utilized. Accordingly, the various microservices may need to communicate with each other to provide a response to the user request. In at least one embodiment, the communication between the microservices may be executed in form of Hypertext Transfer Protocol (HTTP) requests and responses.

Each microservice is depicted to be encapsulated in a container, which in turn is housed in a host. For example, the microservice 108*a* is encapsulated in a container 110*a*, which is housed in a host 112*a*; the microservice 108*b* is encapsulated in a container 110*b*, which is housed in a host 112*b*; and the microservice 108*c* is encapsulated in a container 110*c*, which is housed in a host 112*c*. Each container is configured to provide the necessary runtime environment for the execution of the respective microservice. It is noted that the application 106 is depicted to be associated with only three microservices for illustration purposes. It is understood that the application 106 may be associated with hundreds of such microservices. Moreover, several microservices can share a pool of hosts. Accordingly, a single host may include one or more microservices.

In an illustrative example, the user 102 may use a Web browser application installed in the electronic device 104 to access the application 106 over a communication network, such as a network 120. More specifically, the application 106 may be associated with a Web address, which may be accessible over the network 120 using the Web browser application installed in the electronic device 104. Some non-limiting examples of the electronic device 104 may include a laptop computer, a Smartphone, a desktop computer, a workstation terminal, a personal digital assistant, a wearable device or in general any computing device capable of Web access. The network 120 may include wired networks, wireless networks and combinations thereof. Some non-limiting examples of the wired networks may include Ethernet, local area networks (LANs), fiber-optic networks, and the like. Some non-limiting examples of the wireless networks may include cellular networks like GSM/3G/4G/5G/LTE/CDMA networks, wireless LANs, Bluetooth, Wi-Fi or ZigBee networks, and the like. An example of a combination of wired and wireless networks may include the Internet.

In at least one example embodiment, the user communication with the application 106 is facilitated through a network gateway 130. The environment 100 further depicts a server system 150, which is configured to be in communication with the network gateway 130 and with the hosts housing the microservices in containers, such as the hosts 112*a*, 112*ba* and 112*c*. The server system 150 is configured to perform a tuning of a performance of the microservices-based application 106, as will be explained in detail with reference to FIGS. 2 to 5B.

Figure 2:
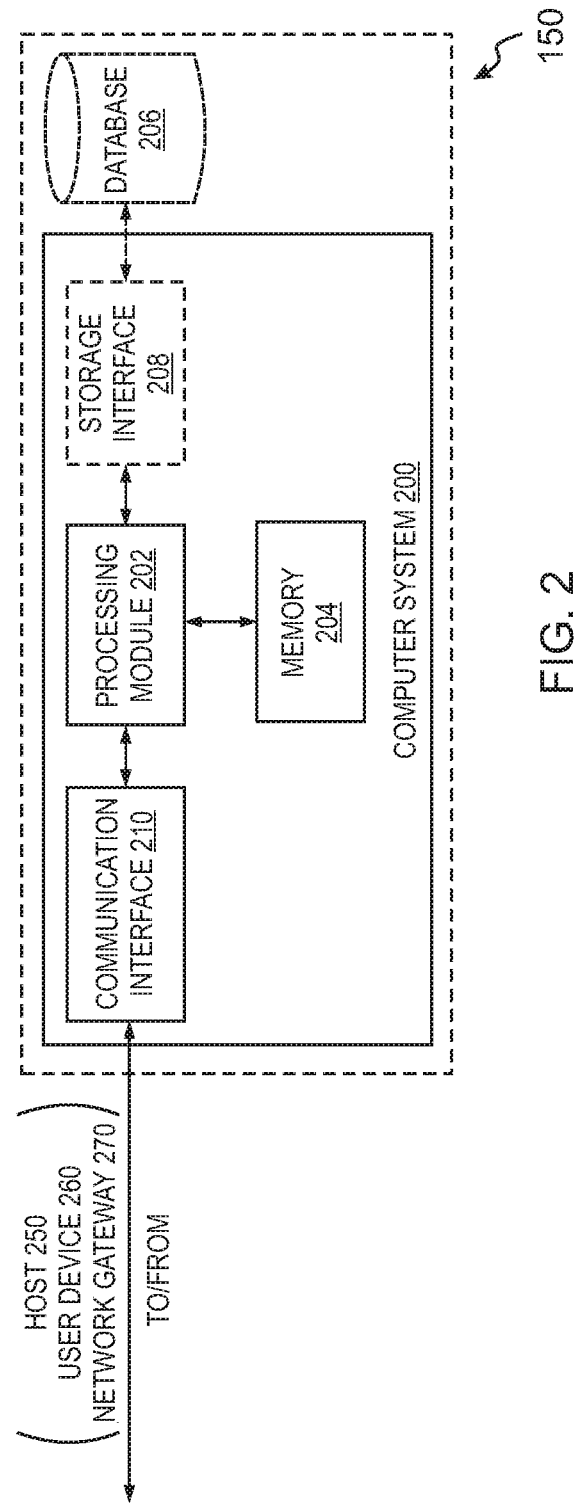
FIG. 2 is a block diagram of server system for tuning performance of a microservices-based application, in accordance with an example embodiment of the invention.

FIG. 2 is a block diagram of the server system 150 for tuning performance of a microservices-based application, in accordance with an example embodiment of the invention. The term 'tuning of performance of an application' as used herein implies ensuring microservices associated with the application or, more specifically the microservice instances associated with the application, are deployed in a manner that reduces the volume of communication, while also taking care of the network latencies between hosts, thereby tuning a performance of the microservices-based application to its optimum level.

The server system 150 may be embodied as a cloud-based platform in a Web server capable of being accessed over a communication network, such as the network 120 explained with reference to FIG. 1. The cloud-based platform may provision microservice performance auto-tuning services as a Web service accessible through a Website. In such a scenario, users such as network administrators, IT personnel, individual programmers may access the Website over the network 120 using Web browser applications installed in their respective electronic devices and thereafter use the server system 150 for tuning performance of their respective microservices-based applications. The server system 150 includes a computer system 200 and a database 206.

The computer system 200 includes at least one processing module 202 for executing machine executable instructions, such as instructions related to automatic tuning of performance of microservices-based applications. In an illustrative example, the instructions may include instructions related to evaluating predefined criteria for relocation of microservice instances, instructions for facilitating redeployment of microservice instances, and the like. The machine executable instructions may be stored in, for example, but not limited to, a memory 204 for processing by the processing module 202. In an embodiment, the processing module 202 may be embodied as a multi-core processor, a single core processor, or a combination of one or more multi-core processors and one or more single core processors. For example, the processing module 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processing module 202 may be configured to execute hard-coded functionality. In an embodiment, the processing module 202 is embodied as an executor of software instructions, wherein the instructions may specifically configure the processing module 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.).

In some embodiments, in addition to storing instructions related to automatic tuning of performance of the microservices-based applications, the memory 204 may store one or more machine learning algorithms capable of identifying patterns in traffic flow and predicting future traffic flows or, more specifically, future volumes of communication among hosts based on the identified patterns. The tuning of the performance of the microservices-based application may be performed based, at least in part, on the predicted traffic flows.

The processing module 202 is operatively coupled to a communication interface 210 such that the computer system 200 is capable of communicating with remote device such as a host 250 (e.g., the host 112*a*, 112*b* or 112*c* shown in FIG. 1), a user device 260 (e.g., the electronic device 104 shown in FIG. 1), a network gateway 270 (e.g., the network gateway 130 shown in FIG. 1), and or any entity accessible over the network 120 shown in FIG. 1.

The communication interface 210 may include communication circuitry such as for example, a transceiver circuitry including antenna and other communication media interfaces to connect to a wired and/or wireless communication network. The communication circuitry may, in at least some example embodiments, enable transmission of data signals and/or reception of signals to and/or from network entities, such as the network gateway 270, hosts housing the microservices in containers, and the like.

For example, the communication interface 210 enables reception of a request from the user device 260 to perform automatic tuning of the microservices-based application. Similarly, the communication interface 210 enables monitoring the traffic flows across a plurality of hosts and keeping track of baseline latencies across hosts. Further, the communication interface 210 enables causing termination of microservice instances on a respective current host and their subsequent re-initiation on another host.

The processing module 202 may also be operatively coupled to the database 206. The database 206 is any computer-operated hardware suitable for storing and/or retrieving data, such as, but not limited to, identities of microservice instances associated with the microservices-based application, identities of hosts housing the microservice instances, traffic flow data such as volume of communication in bytes associated with typical user requests and the microservice instances involved in responding to the user requests, baseline latencies between hosts in milliseconds, and the like. In some embodiments, the database 206 further includes data related to resource requirements and affinity/anti-affinity preferences associated with each microservice instance. Some examples of resource requirements may include requirements such as CPU shares required, disk space required, memory required, and the like. The database 206 may include multiple storage units such as hard disks and/or solid-state disks in a redundant array of inexpensive disks (RAID) configuration. The database 206 may include a storage area network (SAN) and/or a network attached storage (NAS) system. In some embodiments, the database 206 is integrated within the computer system 200. For example, the computer system 200 may include one or more hard disk drives as the database 206. In other embodiments, the database 206 is external to the computer system 200 and may be accessed by the computer system 200 using a storage interface 208. The storage interface 208 is any component capable of providing the processing module 202 with access to the database 206. The storage interface 208 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processing module 202 with access to the database 206.

The computer system 200 in conjunction with the database 206 is configured to perform the various functions as will be explained hereinafter.

In an embodiment, the processing module 202 of the server system 150 is configured to monitor a plurality of traffic flows associated with user requests related to the application for a predefined sampling period. Each traffic flow represents all the communication among microservice instances (which are deployed on different hosts) in response to a user request. More specifically, each traffic flow is associated with a total volume of communication among microservice instances for a respective user request. This is further explained with reference to an illustrative example hereinafter.

In an illustrative example, a user request for a service from an application may result in a series of cascaded hypertext transfer protocol (HTTP) requests/responses between microservice instances. For example, a user request may result in a microservice instance S1 deployed on a Host H1 communicating with a microservice instance S2 deployed on a Host H2, which in turn may communicate with a microservice instance S3 deployed on a Host H3. The communication between microservice instances may be in form of HTTP requests and HTTP responses and the series of cascading HTTP requests/responses between microservice instances is referred to herein as a 'traffic flow' or 'flow'. Accordingly, traffic flow results in response to a user request and is associated with a total volume of communication among the microservice instances. In an illustrative example, the total volume of communication is measured in bytes. For example, the sum of individual volumes of communication between two microservice instances in the traffic flow configures the total volume of communication associated with the traffic flow.

The monitoring of the traffic flows may be performed in response to a trigger event. Some examples of the trigger event may include, but are not limited to, an occurrence of a vacancy created on a host after a termination or a movement of a microservice instance, an occurrence of an addition or a deletion of a host, a receipt of a user instruction to perform automatic tuning of the performance of the application, and the like. In some embodiments, a receipt of an indication like an alarm or alert message to perform pre-scheduled tuning of the performance of the application may serve as the trigger event for monitoring the plurality of traffic flows. Accordingly, any of such trigger events, may cause the processing module 202 to monitor the traffic flows.

The processing module 202 is configured to monitor the traffic flows for a predefined sampling period. The predefined sampling period may be chosen to be any length of time based on user input or in some cases, the processing module 202 may select the predefined sampling period based on application usage patterns. In an illustrative example, the predefined sampling period may be chosen as one day or a one-hour period. In addition to monitoring the plurality of traffic flows for the predefined sampling period, the processing module 202 is also configured to keep track of baseline latencies across hosts in milliseconds.

Each traffic flow includes one or more flow segments, such as for example, in the above example, traffic flow between microservice instances S1, S2 and S3 involve flow segments corresponding to flow of communication between S1 and S2, S2 and S3, S3 and S2, and S2 and S1. Each flow segment may be associated with respective volume of communication. The total volume of communication as indicated by the traffic flow, therefore, is a sum of individual volumes of communication associated with the corresponding flow segments.

In at least one embodiment, the processing module 202 of the server system 150 identifies a traffic flow associated with a highest total volume of communication from among the plurality of traffic flows. The traffic flow with the highest total volume of communication may be identified subsequent to the completion of the predefined sampling period for monitoring all the traffic flows. The processing module 202 is further configured to select flow segments in a decreasing order of respective individual volume of communication for the traffic flow identified to be associated with the highest total volume of communication. For example, if a traffic flow 'X' associated with flow segments X1, X2 and X3 is identified to be associated with the highest total volume of communication, then the flow segments X1, X2 and X3 may be selected in the order of decreasing order of respective individual volume of communication. For example, if X2 is associated with the highest volume of communication among the three flow segments, followed by X3 and X1, then the processing module 202 may be configured to select X2 followed by X3 and then X1.

In an embodiment, for each selected flow segment, the processing module 202 identifies a pair of microservice instances associated with the flow segment. In an illustrative example, the processing module 202 may first determine if at least one microservice instance from among the pair of microservice instances is capable of being relocated from a respective current host to another host for achieving at least one predetermined performance objective. Some non-limiting examples of the predetermined performance objective may include an objective related to reducing a volume of communication between hosts deploying the pair of microservice instances, an objective related to reducing a communication latency between the hosts deploying the pair of microservice instances, and the like.

For example, a user request may result in communication among a microservice instance S1 deployed on Host a H1, a microservice instance S2 deployed on a Host H2, and a microservice instance S3 deployed on a Host H3 such that the flow segments associated with the corresponding traffic flow are S1 and S2, S2 and S3 and S3 and S1. The processing module 202 may first select a flow segment with the highest individual volume of communication among the three flow segments. As an example, the server system 150 may select flow segment S2 and S3, implying that the volume of communication from S2 and S3 is the highest. The processing module 202 may first determine if any one of the microservice instances S2 and S3 can be relocated such that the volume of communication decreases. More specifically, the server system 150 may determine if the microservice instance S2 can be relocated from the current host H2 to any other host or if the microservice instance S3 can be relocated from the current host H3 to another host such that the volume of communication between S2 and S3 reduces or they are deployed on a host pair with least baseline latency between them.

In one embodiment, the processing module 202 may first determine if the pair of microservice instances is capable of being collocated on a single host. For example, the server system 150 may determine if the microservice instances S2 and S3 can both be deployed on the host H2 or the host H3 or any single host other than H2 and H3. The determination of such a relocation includes performing evaluation of predefined criteria such as for example, criteria related to a resource requirement of a microservice instance to be relocated on a host and the resource availability of that host, criteria related to one or more affinity and anti-affinity rules associated with the microservice instance to be relocated on a host and with microservice instances currently deployed on that host, a criteria related to a change in baseline latency between hosts deploying the pair of microservice instances resulting from relocation of the microservice instance from the respective current host to the another host, and the like. The criteria related to resource requirement may evaluate whether the CPU shares or disk space needed by a microservice instance being relocated can be handled by the host or not. Similarly, the criteria related to the affinity and/or anti-affinity rules may evaluate if affinity or anti-affinity preferences associated with microservice instance being relocated and with the microservice instances currently residing in the host to which the microservice instance is being relocated do not preclude such relocation.

In the event, that the processing module 202 determines that the pair of microservice instances is incapable of being collocated on the single host, then the processing module 202 determines if the pair of microservice instances can be relocated to a host pair with least latency. To that effect, the processing module 202 may be configured to identify another host associated with least baseline latency from among several hosts for relocating the at least one microservice instance to achieve the predetermined performance objective. It is noted that the identified host for relocating the microservice instance may be chosen for relocation only upon successful evaluation of the predefined criteria. More specifically, the host may be capable of handling resource requirements, such as CPU shares required, memory and/or disk space required by the microservice instance to be relocated from the current host and moreover, affinity and/or anti-affinity preferences of the existing microservice instances deployed in the host and the microservice instance being relocated may not preclude such relocation.

In one embodiment, the processing module 202 facilitates redeployment of the microservice instance from the current host to a single host or to another host for achieving the predetermined performance objectives. In one embodiment, the redeployment may include causing a termination of the microservice instance (i.e. the microservice instance to be relocated) deployed on the current host. The processing module 202 further causes an initiation that microservice instance on another host after its termination on the current host. In some embodiments, the processing module 202 further facilitates a registration of the relocated microservice instance for enabling discovery of the microservice instance at its new location by remaining microservice instances associated with the application.

Each flow segment of the traffic flow may be selected and evaluated for optimizing performance, for example by relocating at least one microservice instance to a host which reduces individual volume of communication or to a host with least communication latency. After the evaluation, the redeployment of the microservice instances may be performed. Thereafter, the steps of (1) identifying the traffic flow with highest total volume of communication, (2) selecting corresponding one or more flow segments and, (3) performing relocation of microservice instances to reduce communication latency and/or volume of communication may be performed for each of the remaining traffic flows, thereby improving or tuning a performance of the application.

In some embodiments, the processing module 202 may be caused to identify at least one traffic flow pattern during the monitoring of the traffic flows associated with the user requests related to the application. Further, the processing module 202 may be configured to predict future traffic flows based on the identified at least one traffic flow pattern and tune the performance of the application based, at least in part, on the prediction of the future traffic flows.

As explained above, the microservice instances associated with the application are redeployed. Moreover, the redeployment of microservices in hosts based on the observed traffic flows is performed automatically without any manual intervention. An example communication between the processing module 202 and the plurality of hosts housing the microservice instances to perform the performance tuning of the microservices-based application is explained in further detail with reference to FIG. 3.

Figure 3:
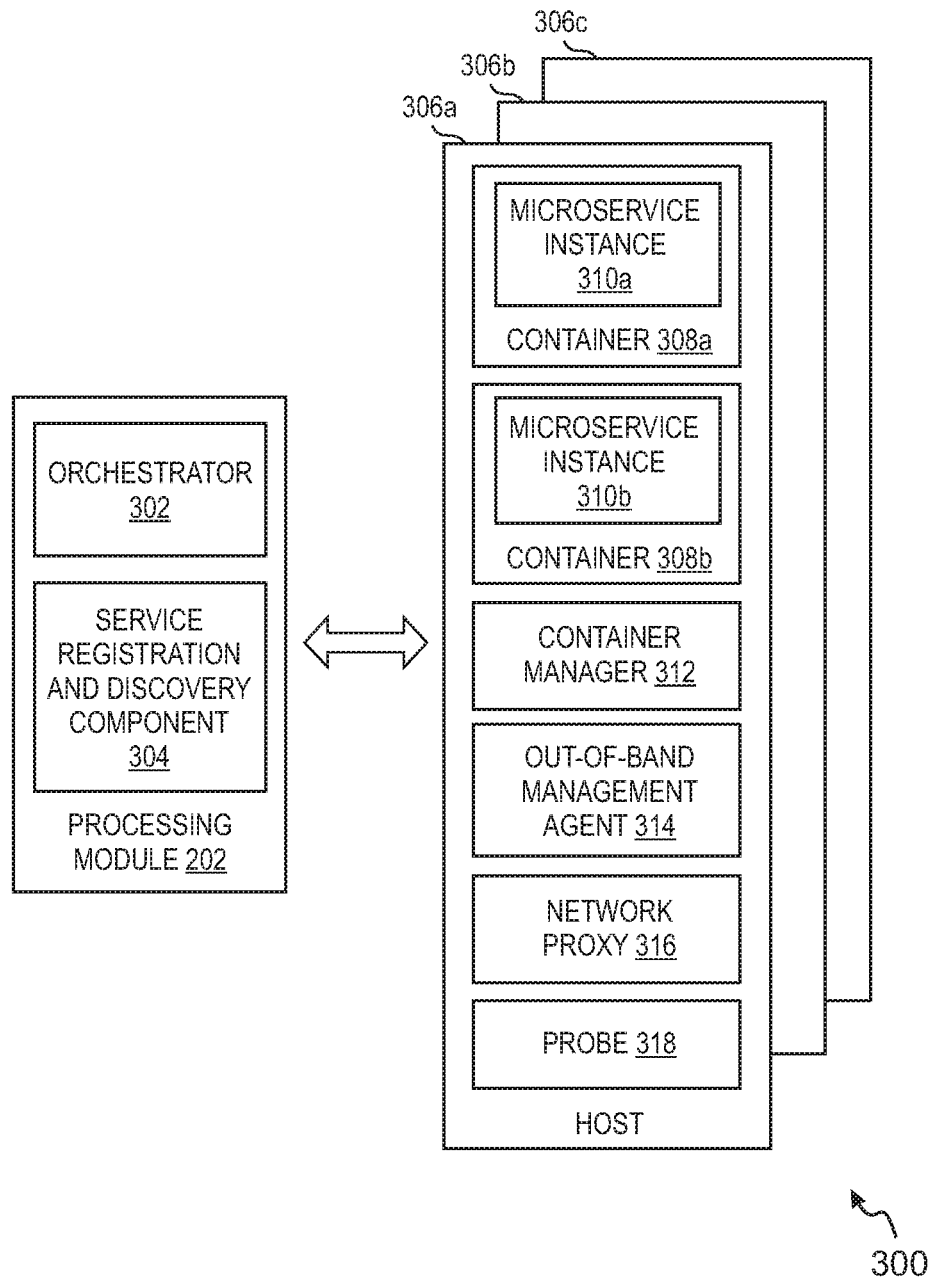
FIG. 3 shows a simplified block diagram for illustrating communication between a processing module of the server system of FIG. 2 and a plurality of hosts housing the microservices associated with an application, in accordance with another example embodiment of the invention.

FIG. 3 shows a simplified block diagram 300 for illustrating communication between the processing module 202 of the server system 150 (shown in FIG. 2) and a plurality of hosts housing microservice instances associated with an application, in accordance with an example embodiment of the invention. In the block diagram 300, the processing module 202 is depicted to include an orchestrator 302 and a service registration and discovery component 304. The block diagram 300 is also configured to depict a plurality of hosts, such as hosts 306a, 306b to 306c. Each host includes one or more microservice instances in containers, a container manager, an out-of-band management agent, a network proxy and one or more probes. For example, the host 306a is depicted to include two containers 308a and 308b with each container including a microservice instance. For example, the container 308a includes a microservice instance 310a and the container 308b includes a microservice instance 310b. As explained with reference to FIG. 1, each microservice is associated with the execution of a specific function of an application. Moreover, each microservice is stateless and is associated with a plurality of instances. The host 306a is further depicted to include a container manager 312, an out-of-band management agent 314, a network proxy 316 and a probe 318.

In one embodiment, the orchestrator 302, also referred to as a scheduler, is configured to have visibility across application policies, application component runtime performance and infrastructure performance metrics including compute, storage and network. The orchestrator 302 is configured to deploy containers on the most appropriate host and connect them together. The deployment of containers may involve defining constraints (such as affinity and anti-affinity rules, etc.). The orchestrator 302 is also configured to scale containers if data to process/compute for a microservice instance exceeds a predetermined limit, say as 15 GB RAM limit, etc. The orchestrator 302 also handles failures by doing automatic fail-overs.

The service registration and discovery component 304 is configured to enable the microservices (i.e., the microservice instances) to register themselves, thereby enabling microservices to find other microservices. More specifically, the microservice instances may register identifying information such as host, port, node name, and the like, with the service registration and discovery component 304 to facilitate their discovery and use such information to identify other microservices.

The container manager 312 monitors and manages containers encapsulating the microservice instances within the respective host. The container manager 312 is capable of terminating and starting containers of the respective host and gathering runtime information from the containers. The out-of-band management agent 314 is configured to interact with the container manager 312. In at least some embodiments, the out-of-band management agent 314 serves as a controller capable of receiving requests like restart, delete etc. from a user, and translating the requests to API calls to the container manager 312 to facilitate management of the containers running of the host 306a.

The network proxy 316 is configured to proxy the requests of one of the local microservice instance (such as microservice instance 310a or 310b) toward microservice instances running on other hosts. To communicate with each other, microservice instances use a logical name equivalent to Domain Name System (DNS) name (and not an IP address). The network proxy 316 is aware of the actual location of the various microservice instances composing the application. In some embodiments, the network proxy 316 is also configured to perform a simple round robin load balancing with target microservice instances. The probe 318 is used to measure baseline host latencies. Further, the network proxy 316 is used to baseline network information across two hosts.

As explained above, an application may be broken down into microservices and the microservice instances (i.e. individual version of microservices) may be packaged into containers. The containers may then be deployed in hosts. The deployment of the containers including the respective microservices in hosts is based on an initial set of constraints such as CPU shares required, memory required, disk space required, affinity or anti-affinity with other microservices, and the like. In an illustrative example, the orchestrator 302 may be configured to define a soft constraint of type "service affinity" for a known application route. An initial priority for the constraint may be set to 0. During initial placement, the constraint may be used to optimize the initial location of services. Further, the orchestrator 302 may be configured to complete a map of inter-service routes and communication paths based on runtime information. Over time, based on actual traffic across microservices the "service affinity" constraint priority may be adjusted. For example, more traffic results in a higher constraint. The orchestrator 302 also actively measures baseline latencies across hosts. Using the baselines, the server system 150 builds a topology map of latencies with a scoring (e.g. high, medium, low).

In one embodiment, for tuning the performance, in at least one example embodiment, the orchestrator 302 may be configured to determine best location for one or more microservices (or the microservice instances). The determination of the best location may be performed based on algorithm explained in greater detail with reference to an illustrative example in FIG. 4. Subsequent to determining the best location for a microservice instance, the orchestrator 302 may be configured to start an instance of the microservice instance on a host (also referred to herein as another host) if the required resources are available on the host, and the prior instance on a current host may be stopped.

As microservice instances are stopped and started using the respective container manager, such as the container manager 312, the services are registered with the service registration and discovery component 304 and with a service gateway component, which manage the traffic across services and the traffic from external clients (such as the network gateway 130 depicted in FIG. 1).

In one embodiment, if resources are not available on the host, the orchestrator 302 may be configured to check if any existing service can be moved in a manner that results in a better placement for the existing microservice instance. As the orchestrator 302 performs these operations, the microservice instances with the most traffic are automatically relocated on the same host, or on nearby hosts with low latency, thereby tuning the performance of the microservices-based application.

In at least one example embodiment, the processing module 202 including the orchestrator 302 is configured to learn and record the application service traffic patterns, and detect any periodic patterns. Further, overtime the discovery of periodic patterns may be applied in a predictive manner, so the performance of the application is tuned in anticipation of increased traffic across services. For example, machine learning algorithms present in the memory 204 may be used by the processing module 202 to learn traffic flow patterns over various time intervals such as during a day, week, month and year. The traffic flow data may be analysed for identifying patterns and accordingly, the monitored traffic flows (volume of communication in bytes) may be adjusted for variations to facilitate appropriate tuning of performance of the application.

An example placement of microservice instances (or containers of the microservice instances) for facilitating tuning of performance of the microservices-based application is explained next in FIG. 4.

Figure 4:
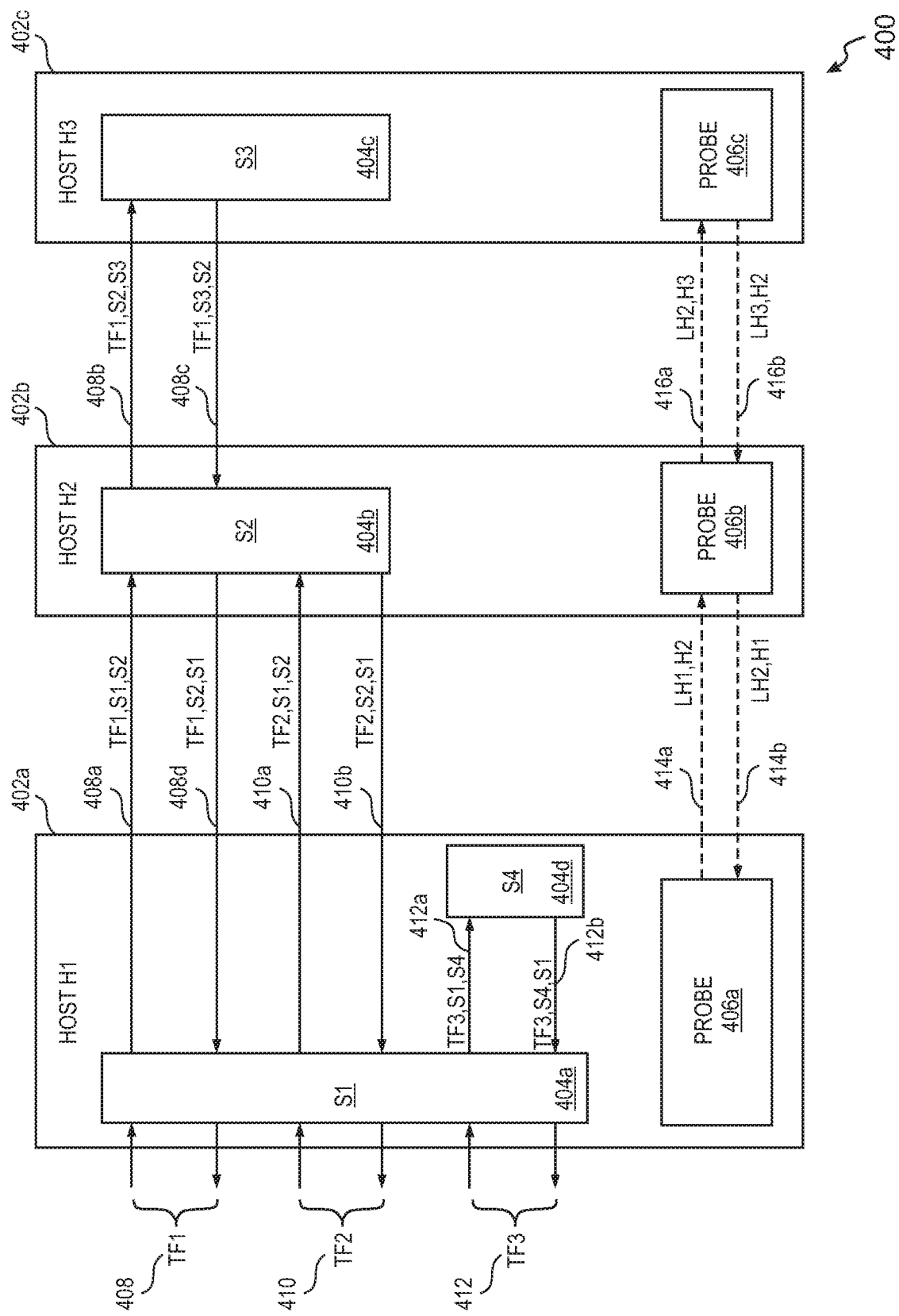
FIG. 4 is a simplified representation showing intercommunication between microservice instances associated with an application for illustrating an example tuning of performance of a traffic flow associated with a user request related to the application, in accordance with an example embodiment of the invention.

FIG. 4 is a simplified representation 400 showing intercommunication between microservice instances associated with an application for illustrating an example tuning of performance of a traffic flow associated with a user request related to the application, in accordance with an example embodiment of the invention. More specifically, a tuning of a flow segment of one traffic flow is explained with reference to FIG. 4. It is noted that all flow segments of the traffic flow may similarly be tuned. Furthermore, all traffic flows may be tuned thereafter to improve the performance of the application.

In many example scenarios, a user request for a service from an application may result in a series of cascaded HTTP requests/responses between microservice instances. For example, if the user wants to make an online payment against a bill, then microservices, or more specifically, microservice instances related to checking user credentials, retrieving an outstanding balance, predicting a payment mode, and the like, may communicate with each other to provide the necessary assistance to the user. Accordingly, the various microservice instances may need to communicate with each other to provide a response to the user request. For the purposes of this example, the term 'microservice instances' are referred to as microservices for ease of description.

In at least one embodiment, the communication between the microservices may be executed in form of Hypertext Transfer Protocol (HTTP) based exchange of information, i.e. HTTP requests and responses. In at least some embodiments, the size of a HTTP request is smaller than the size of a HTTP response. In an illustrative example, the size of a HTTP request is 1 Kb, whereas the size of a HTTP response can range from 1 Kb to 100 Kb. The request rate can range from 1 request per hour up to 100 requests per minutes. It is noted that the volume of communication associated with cascading HTTP requests and responses may be computed based on the size (in bytes) of the individual HTTP requests and responses.

FIG. 4 shows such a series of communication between microservice instances. More specifically, the simplified representation 400 shows three hosts 402a, 402b and 402c. The hosts 402a, 402b and 402c are referred to hereinafter as 'host H1', 'host H2', and 'host H3', respectively. Each host is depicted to include at least one microservice. For example, the host H1 is depicted to include microservices 404a and 404d, referred to hereinafter as 'S1' and 'S4', respectively; host H2 is depicted to include microservice 404b, referred to hereinafter as 'S2'; and host H3 is depicted to include microservice 404c, referred to hereinafter as S3. The volume of communication between microservices in a sampling period is computed in form of traffic flows, such as traffic flows 408, 410 and 412. The traffic flows 408, 410 and 412 are referred to hereinafter as traffic flows TF1, TF2 and TF3, respectively. Each traffic flow represents a sum total of number of bytes sent between individual microservice instances on flow segments in a sampling period. The traffic on a flow segment, i.e. number of bytes sent between S1 and S2 is shown by link 408a and is represented by TF1, S1, S2. Similarly the links 408b, 408c, 408d, 410a, 410b, 412a and 412b show traffic flow in a sampling period between S2 and S3 (i.e. TF1, S2, S3), S3 and S2 (i.e. TF1, S3, S2), S2 and S1 (i.e. TF1, S2, S1), S1 and S2 (i.e. TF2, S1, S2), S2 and S1 (i.e. TF2, S2, S1), S1 and S4 (i.e. TF3, S1, S4), and S4 and S1 (i.e. TF3, S4, S1), respectively.

Each host is further depicted to include a latency probe. For example, host H1 is depicted to include a latency probe 406a; host H2 is depicted to include a latency probe 406b; and host H3 is depicted to include a latency probe 406c. The links 414a, 414b, 416a and 416b depict latency measured between the hosts H1 and H2 (i.e. LH1, H2), H2 and H1 (i.e. LH2, H1), H2 and H3 (i.e. LH2, H3), and H3 and H2 (i.e. LH3, H2), respectively, as measured by the latency probes 406a, 406b and 406c.

In an embodiment, the processing module 202 (or more specifically, the orchestrator 302) is configured to monitor the traffic flow in bytes for each traffic flow in a given time frame, also called as a predefined sampling period. For example, volume of all traffic associated with each traffic flow in a day or in one-hour time period may be monitored. Moreover, the processing module 202 also measures baseline latencies across hosts in milliseconds. The measured information is recorded and stored in the database 206. In an illustrative example, the orchestrator 302 in the processor 202 may record the location of each microservice (i.e. each microservice instance) in the database 206. An example form of storing such a record is depicted in Table 1.

TABLE 1

| Service Instance | Host |
|---|---|
| S1 | H1 |
| S2 | H2 |
| S3 | H3 |
| S4 | H1 |
| ... | ... |

In some example scenarios, the orchestrator 302 may also store other detailed characteristics of the microservices and the hosts such as network address, port, memory used, CPU, etc., and the like, in Table 1. In another illustrative example, the orchestrator 302 may record the latency measured between each pair of hosts in the database 206. An example form of storing such a record is depicted in Table 2.

TABLE 2

| Host Pair | Latency (ms) |
|---|---|
| H1, H2 | LH1, H2 |
| H2, H1 | LH2, H1 |
| H2, H3 | LH2, H3 |
| H3, H2 | LH3, H2 |
| ... | ... |

In one embodiment, the latency entries in the Table 2 may be sorted by increasing latency. The orchestrator 302 may further be configured to record the respective individual volume of communication in bytes for each segment of each flow. For instance TF1, S1, S2 represents the number of bytes sent by microservice S1 to microservice S2 as part of traffic flow 1. An example form of such a record is depicted in Table 3.

TABLE 3

| Flow | Host Pair | Volume (bytes) |
|---|---|---|
| 1 | S1, S2 | TF1, S1, S2 |
| 1 | S2, S3 | TF1, S2, S3 |

TABLE 3-continued

| Flow | Host Pair | Volume (bytes) |
|---|---|---|
| 1 | S3, S2 | TF1, S3 S2 |
| 1 | S2, S3 | TF1, S2, S3 |
| 2 | S1, S2 | TF2, S1, S2 |
| 2 | S2, S1 | TF2, S2, S1 |
| 3 | S1, S4 | TF3, S1, S4 |
| 3 | S4, S1 | TF3, S4, S1 |
| ... | ... | ... |

In one embodiment, the orchestrator 302 in the processing module 202 records the total volume of communication associated with each traffic flow during the predefined sampling period. For example, traffic flow may be computed as a total volume of communication associated with respective individual flow segments as depicted in equation (1)

$$TF1 = TF1,S1,S2 + TF1,S2,S3 + TF1,S3,S2 + TF1,S3,S2 + TF1,S2,S3 \qquad \text{Eq. (1)}$$

Similarly, the traffic flow for various other flows may be determined by the sum total of the respective individual flow segments. In one embodiment, the traffic flow may be recorded in a tabular form and the table may be sorted by decreasing amount of volume of communication as depicted in Table. 4.

TABLE 4

| Service Instance | Traffic Flow (Bytes) |
|---|---|
| 1 | TFI |
| 2 | TF2 |
| 3 | TF3 |
| ... | ... |

In one embodiment, the server system 150, i.e. the processing module 202 of the server system 150 is configured to identify traffic flow associated with the highest total volume of communication for performing tuning. For example, from Table 4, which depicts the traffic flow in the decreasing amount of total volume of communication, traffic flow 1 (i.e. TF1) with the highest total volume of communication (in bytes) may be identified.

For performance tuning of the traffic flow with the highest total volume of communication, individual flow segments within the traffic flow are tuned in the order of decreasing volume. As explained above, TF1 comprises flow segments TF1,S1,S2, TF1,S2,S3, TF1,S3,S2, TF1,S3,S2 and TF1,S2,S3. The microservice instances associated with these flow segments are selected for performance tuning in order of decreasing individual volume of communication. For example, if TF1,S3,S2 has highest individual volume of communication, then TF1,S3,S2 is selected for performance tuning first, followed by the flow segment with the next highest individual volume of communication and so on and so forth.

For tuning individual flow segments, the server system 150, i.e. the processing module 202 of the server system 150 is configured to identify the pair of microservices (i.e. pair of microservice instances) associated with the selected flow segment. For example, for flow segment TF1, S3, S2, the pair of microservices identified is S3 and S2. The processing module 202 of the server system 150 then determines if at least one microservice from among the pair of microservices is capable of being relocated from a respective current host to another host for achieving at least one predetermined performance objective. Some non-limiting examples of the predetermined performance objective may include an objective related to reducing a volume of communication between hosts deploying the pair of microservice instances, an objective related to reducing a communication latency between the hosts and the like. More specifically, the processing module 202 may determine if S2 can be relocated from the current host H2 to any other host or if S3 can be relocated from the current host H3 to another host such that the volume of communication between S2 and S3 reduces or they are deployed on hosts with least communication latency between them.

In one embodiment, the processing module 202 may determine if the pair of microservices is capable of being collocated on a single host. For example, the processing module 202 may determine if the microservice instances S2 and S3 can both be deployed on host H2 or host H3, or any single host other than H2 and H3. The determination of such a relocation includes performing evaluation of predefined criteria such as criteria explained with reference to FIG. 2.

In the event, that the processing module 202 determines that the pair of microservice instances is incapable of being collocated on the single host, then the processing module 202 determines if the pair of microservice instances can be relocated to a host pair with least latency. To that effect, the processing module 202 may be configured to identify another host associated with least baseline latency from among several hosts for relocating the at least one microservice instance to achieve the predetermined performance objective. It is noted that the identified host for relocating the microservice instance may be chosen for relocation only upon successful evaluation of the predefined criteria. More specifically, the host may be capable of handling resource requirements, such as CPU shares required, memory and/or disk space required by the microservice instance to be relocated from the current host and moreover, affinity and/or anti-affinity preferences of the existing microservice instances deployed in the host and the microservice instance being relocated may not preclude such relocation.

In an illustrative example, a sub-function "test_service_move (S1, Hx)" may be defined which is configured to determine if microservice S1 can be moved to Host Hx. To make the determination, the processing module 202 uses: (1) configured constraints such as service affinity rules, service anti-affinity rules, placement labels, etc.; and (2) current runtime state of the server system 150 such as ports, memory, disk, CPU required by S1 to run on Hx.

Furthermore, another sub-function "move_service (S1, Hx)" may be defined to "physically" move the microservice S1 to host Hx. Once the microservice is moved, all the other flows involving S1 are invalidated. The invalidated flows may be re-recorded based on the new topology during the next sampling period.

To summarize, the microservices are then deployed in a manner that reduces the traffic flow, while also taking care of the network latencies between hosts, thereby tuning a performance of the microservices-based application to its optimum level. Moreover, the redeployment of microservices in hosts based on the observed traffic flows is performed automatically without any manual intervention.

Figure 5A:
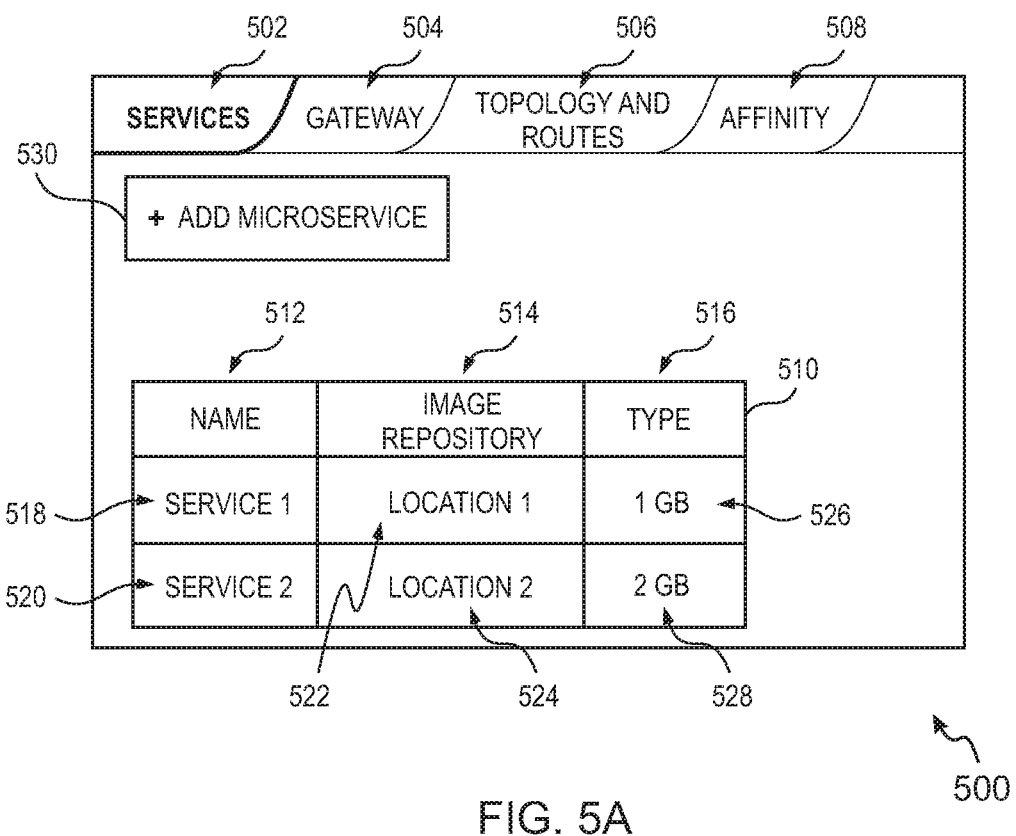
FIGS. 5A and 5B show simplified representations of UIs for defining an affinity rule, in accordance with an example embodiment of the invention.
Figure 5B:
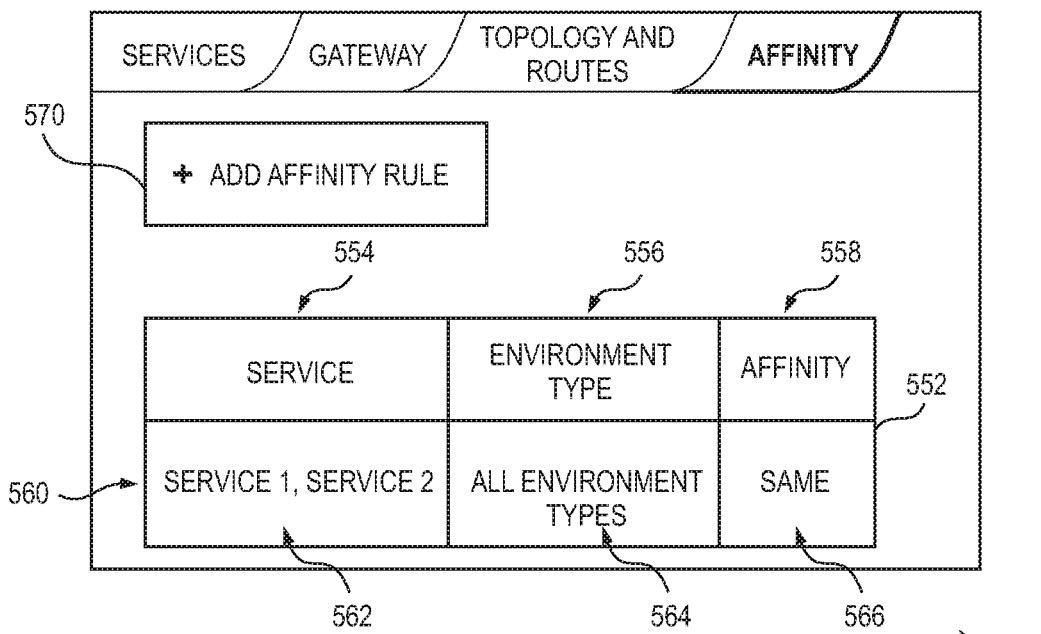

FIGS. 5A and 5B show simplified representation of UIs for setting of an affinity rule, in accordance with an example embodiment of the invention. The UIs may be presented to a developer of the application, a network administrator, an IT personnel or any such individual by the server system 150 to facilitate setting of criteria for evaluating placement of microservices in hosts.

Accordingly, FIG. 5A depicts a UI 500 showing a plurality of tabs such as tabs 502, 504, 506 and 508. The tabs 502, 504, 506 and 508 are depicted to be associated with labels 'SERVICES', 'GATEWAY', 'TOPOLOGY AND ROUTES' and 'AFFINITY'. It is understood that only four tabs are shown herein for illustration purposes and that the UI 500 may be configured to include more or fewer tabs than those depicted in the UI 500. The tab 502 may be configured to be associated with content as depicted in the UI 500. More specifically, the UI 500 depicted in FIG. 5A may correspond to the tab 502 and is configured to display a listing of microservices associated with the application. The tab 504 may be associated with a UI displaying information related to gateway, such as the network gateway 130 shown in FIG. 1. The tab 506 may be associated with a UI showing a map of routes connecting the microservices and associated baseline latencies between hosts. The tab 508 may be associated with a UI such as a UI 550 as will be explained with reference to FIG. 5B.

The UI 500 is depicted to include a table 510 including a plurality of columns, such as columns 512, 514 and 516. The column 512 is depicted to be associated with title 'NAME' (i.e. a microservice name) and includes two entries 518 and 520 associated with text 'SERVICE 1' and 'SERVICE 2', implying that the application is associated with two microservices, i.e. service 1 and service 2. The column 514 is depicted to be associated with title 'IMAGE REPOSITORY' and includes two entries 522 and 524 corresponding to the entries 518 and 520 and associated with text 'LOCATION 1' and 'LOCATION 2', respectively, implying that the images of the service 1 and service 2 are downloaded from location 1 and location 2, respectively. The column 516 is depicted to be associated with title 'TYPE' and is indicative of the memory requirement associated with each microservice. The column 516 includes two entries 526 and 528 corresponding to the entries 518 and 520 and associated with text '1 GB' and '2 GB', respectively, implying that the service 1 is associated with a memory (i.e. RAM) requirement of 1 GB, whereas the service 2 is associated with a memory requirement of 2 GB.

The UI 500 further includes a button 530 capable of being selected by a click or touch input by the user. The button 530 is depicted to be associated with text '+ADD MICROSERVICE'. The user may provide a selection of the button 530 to add microservices to the application and further provide an indication of a location from where the service image is to be downloaded and the memory requirement associated with the microservice to be added.

In an embodiment, the user may provide a selection of the tab 508 to set an affinity rule. Upon selection of the tab 508, the user may be presented a UI, such as the UI 550 shown in FIG. 5B.

Referring now to FIG. 5B, the UI 550 shows a table 552 including a plurality of columns, such as columns 554, 556 and 558. The columns 554, 556 and 558 are depicted to be associated with titles 'SERVICE', 'ENVIRONMENT TYPE' and 'AFFINITY', respectively. The table 552 is depicted to include a single row 560 showing three entries 562, 564 and 566 corresponding to the columns 554, 556 and 558, respectively. The entry 562 is depicted to be associated with text 'SERVICE 1, SERVICE 2', the entry 564 is depicted to be associated with text 'ALL ENVIRONMENT TYPES' and the entry 566 is depicted to be associated with text 'SAME HOST', respectively. Such an entry implies that the two microservices, service 1 and service 2, need to be always deployed in the same host. In many example scenarios, the two services may be associated with internal messages that cannot be sent across hosts and as such the two services may have to be deployed in a single host. Accordingly, an affinity rule may be defined to deploy the two microservices in the same host. The UI 550 depicts a button 570 associated with text '+ADD AFFINITY RULE'. The user may provide a selection of the button 570 to construct additional affinity rules.

It is noted that the user may also create anti-affinity rules. In an illustrative example, if it is known that two microservices are memory intensive and are causing frequent recycling of the memory cache then the user may define an anti-affinity rule to preclude them from being deployed on the same host. The user may also define constraints/rules related to resource utilization. In an illustrative example, a microservice, for example 'Sa' may be associated with resource requirements, such as 2 CPU shares, a memory of 2 GB and a disk space of 30 GB, whereas another microservice, for example 'Sb' may be associated with resource requirements, such as 1 CPU share, a memory of 4 GB and a disk space of 100 GB, then a rule may be defined that two instances of these services can be scheduled on the same host if and only if the host has at least 3 cores, 6 GB on RAM and 130 GB of disk space.

As explained with reference to FIGS. 2 to 4, the processing module 202 may take into considerations resource constraints, affinity rules and the like, for determining if a microservice instance is capable of being deployed in a host or not. The microservices are then deployed in a manner that reduces the volume of communication associated with the traffic flow, while also taking care of the network latencies between hosts, thereby tuning performance of the microservices-based application to its optimum level. A method for tuning performance of a microservices-based application is explained next with reference to FIG. 6.

Figure 6:
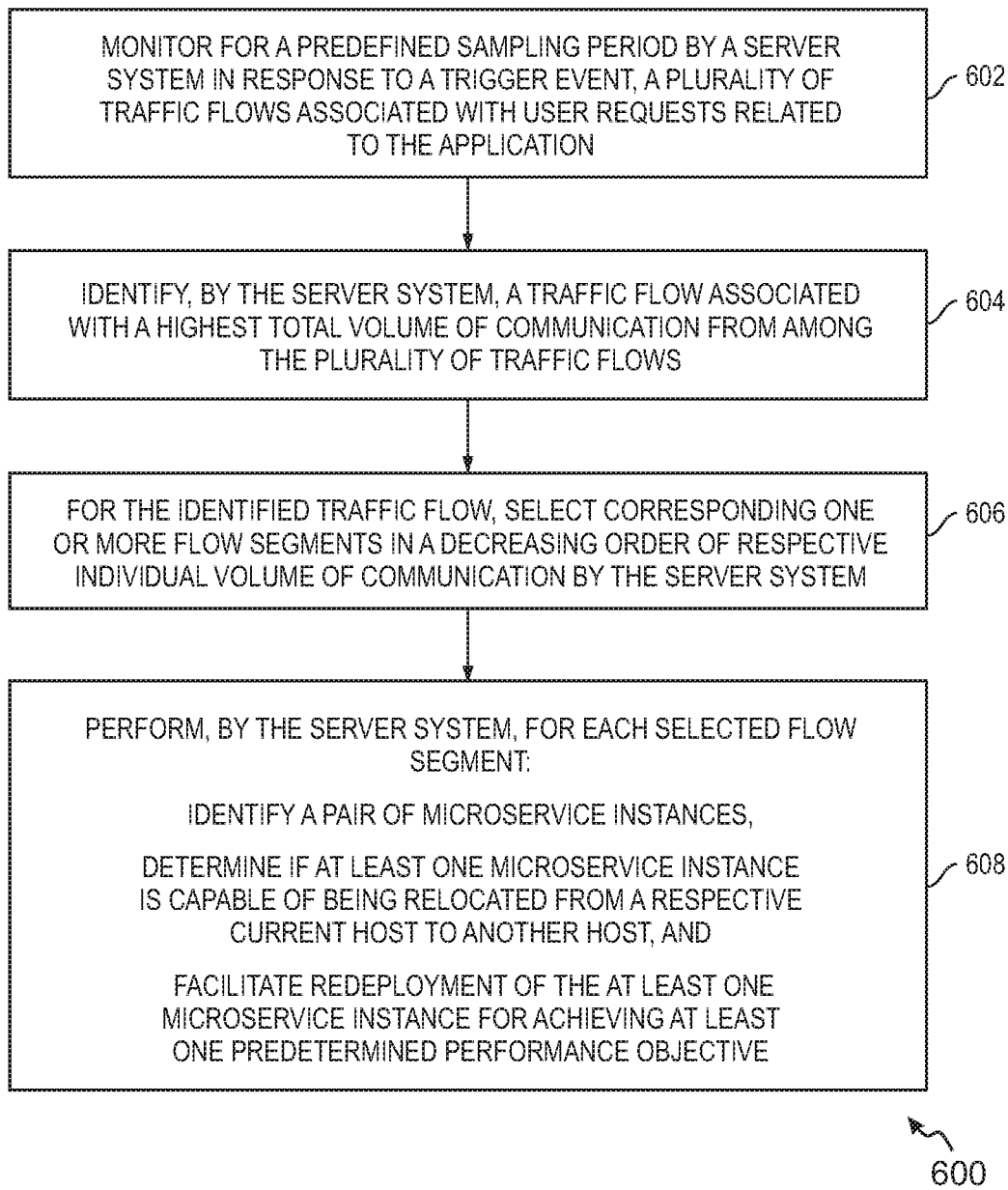
FIG. 6 is a flow diagram of a method for tuning performance of a microservices-based application, in accordance with an example embodiment of the invention.

FIG. 6 is a flow diagram of a method 600 for tuning performance of a microservices-based application, in accordance with an example embodiment of the invention. The various steps and/or operations of the flow diagram, and combinations of steps/operations in the flow diagram, may be implemented by, for example, hardware, firmware, a processor, circuitry and/or by a server system such as the server system 150 explained with reference to FIGS. 1 to 5B, and/or by a different electronic device associated with the execution of software that includes one or more computer program instructions. The method 600 starts at operation 602.

At operation 602, the method 600 includes monitoring for a predefined sampling period by a server system in response to a trigger event, a plurality of traffic flows associated with user requests related to the application. As explained with reference to FIGS. 2 and 4, the series of cascading HTTP requests/responses between microservice instances corresponding to a user request configures a 'traffic flow' or 'flow'. The traffic flow is associated with a total volume of communication among the microservice instances. For example, the sum of individual volumes of communication between two microservice instances in the traffic flow configures the total volume of communication associated with the traffic flow.

The monitoring of the traffic flows may be performed in response to a trigger event. Some examples of the trigger event may include, but are not limited to, an occurrence of a vacancy created on a host after a termination or a movement of a microservice instance, an occurrence of an addition or a deletion of a host, a receipt of a user instruction to perform automatic tuning of the performance of the application, and the like. In some embodiments, a receipt of an indication like an alarm or alert message to perform prescheduled tuning of the performance of the application may serve as the trigger event for monitoring the plurality of traffic flows. Accordingly, any of such trigger events, may cause the server system to monitor the traffic flows.

The plurality of traffic flows is monitored for a predefined sampling period. The predefined sampling period may be chosen to be any length of time based on user input or in some cases, the server system may select the predefined sampling period based on application usage patterns. In an illustrative example, the predefined sampling period may be chosen as one day or a one-hour period. In addition to monitoring the plurality of traffic flows for the predefined sampling period, the server system is also configured to keep track of baseline latencies across hosts in milliseconds.

Each traffic flow includes one or more flow segments, such as for example, in the above example, traffic flow between microservice instances S1, S2 and S3 involve flow segments corresponding to flow of communication between S1 and S2, S2 and S3, S3 and S2, and S2 and S1. Each flow segment may be associated with respective volume of communication. The total volume of communication as indicated by the traffic flow, therefore, is a sum of individual volumes of communication associated with the corresponding flow segments.

At operation 604, the method 600 includes identifying a traffic flow associated with a highest total volume of communication from among the plurality of traffic flows by the server system. The traffic flow with the highest total volume of communication may be identified subsequent to the completion of the predefined sampling period for monitoring all the traffic flows.

At operation 606, for the identified traffic flow, the method 600 includes selecting corresponding one or more flow segments in a decreasing order of respective individual volume of communication by the server system. For example, if traffic flow 'X' associated with flow segments X1, X2 and X3 is identified to be associated with the highest total volume of communication, then the flow segments X1, X2 and X3 may be selected in the order of decreasing order of respective individual volume of communication. For example, if X2 is associated with the highest volume of communication between the three flow segments, followed by X3 and X1, then the processing module 202 may be configured to select X2 followed by X3 and then X1. The identification of the traffic flow with the highest total volume of communication and the selection of the corresponding flow segments may be performed as explained with reference to FIGS. 2 and 4.

At operation 608, the method 600 includes performing for each selected flow segment: (1) identifying a pair of microservice instances (2) determining if at least one microservice instance is capable of being relocated from a respective current host to another host; and (3) facilitating redeployment of the at least one microservice instance for achieving at least one predetermined performance objective. Some non-limiting examples of the predetermined performance objective may include an objective related to reducing a volume of communication between hosts deploying the pair of microservice instances, an objective related to reducing communication latency between the hosts deploying the pair of microservice instances, and the like.

In an illustrative example, a user request may result in communication among a microservice instance S1 deployed on Host H1, a microservice instance S2 deployed on Host H2, and a microservice instance S3 deployed on Host H3 such that the flow segments associated with the corresponding traffic flow are S1 and S2, S2 and S3 and S3 and S1. The server system may first select a flow segment with the highest individual volume of communication among the three flow segments. As an example, the server system may select flow segment S2 and S3, implying that the volume of communication from S2 and S3 is the highest. The server system may first determine if any one of the microservice instances S2 and S3 can be relocated such that the volume of communication decreases. More specifically, the server system may determine if the microservice instance S2 can be relocated from the current host H2 to any other host or if the microservice instance S3 can be relocated from the current host H3 to another host such that the volume of communication between S2 and S3 reduces or they are deployed on hosts with least baseline latency between them.

In one embodiment, the server system may first determine if the pair of microservice instances is capable of being collocated on a single host. For example, the server system may determine if the microservice instances S2 and S3 can both be deployed on host H2 or host H3 or any single host other than H2 and H3. The determination of such relocation includes performing evaluation of predefined criteria such as for criteria explained with reference to FIGS. 2 to 5B.

In the event, that the server system determines that the pair of microservice instances is incapable of being collocated on the single host, then the server system determines if the pair of microservice instances can be relocated to a host pair with least latency. To that effect, the server system may be configured to identify another host associated with least baseline latency from among several hosts for relocating the at least one microservice instance to achieve the predetermined performance objective. It is noted that the identified host for relocating the microservice instance may be chosen for relocation only upon successful evaluation of the predefined criteria The server system then facilitates redeployment of the microservice instance from the current host to a single host or to another host for achieving the predetermined performance objectives. In one embodiment, the redeployment may include causing a termination of the microservice instance (i.e. the microservice instance to be relocated) deployed on the current host. The server system further causes an initiation that microservice instance on another host after its termination on the current host. In some embodiments, the server system further facilitates a registration of the relocated microservice instance for enabling discovery of the microservice instance at its new location by remaining microservice instances associated with the application.

Each flow segment of the traffic flow may be selected and evaluated for optimizing performance, for example by relocating at least one microservice instance to a host which reduces individual volume of communication or to a host with least communication latency. After the evaluation, the redeployment of the microservice instances may be performed. Thereafter, the steps of (1) identifying the traffic flow with highest total volume of communication, (2) selecting corresponding one or more flow segments and, (3) performing relocation of microservice instances to reduce communication latency and/or volume of communication may be performed for each of the remaining traffic flows, thereby improving or tuning a performance of the application.

Figure 7:
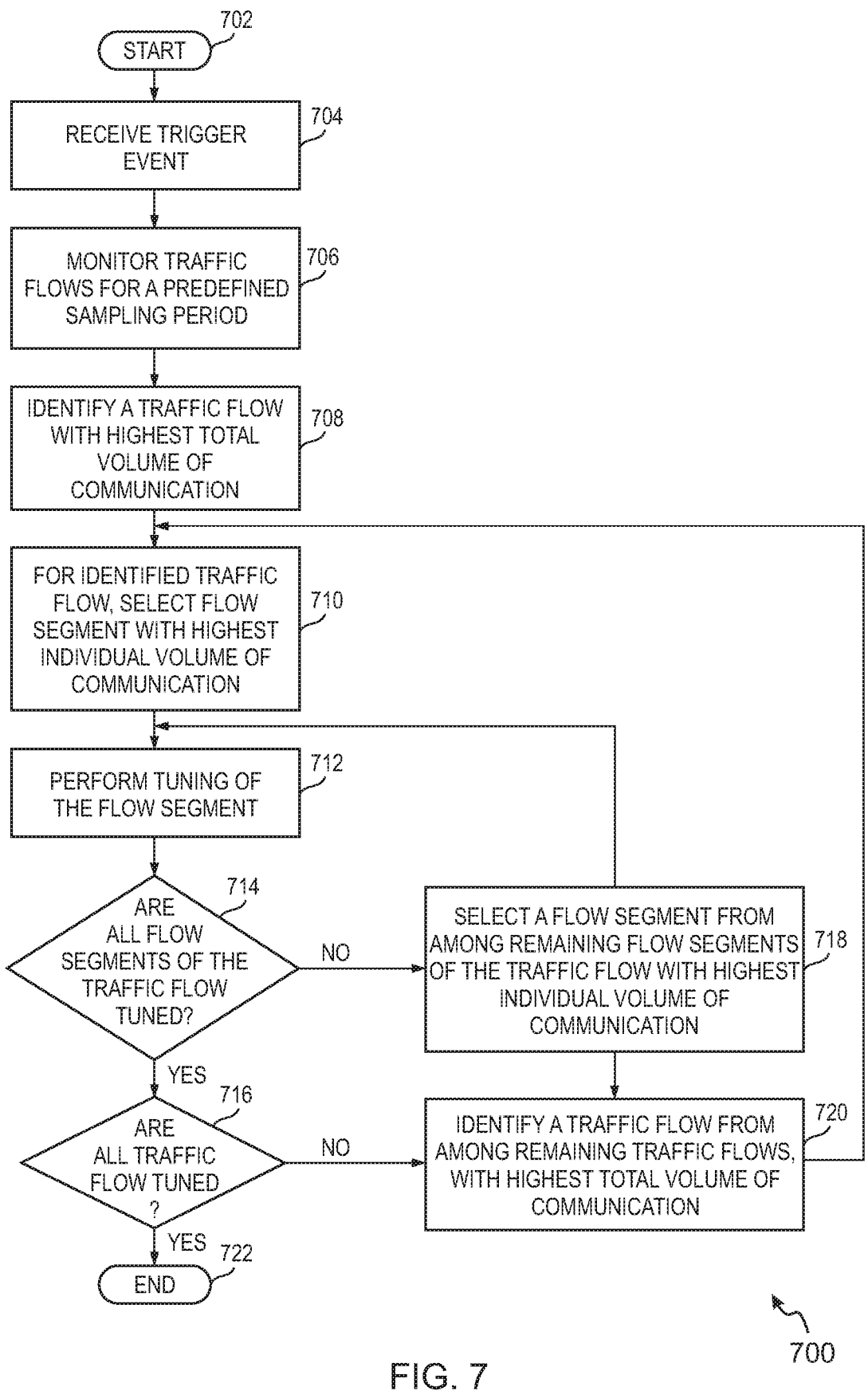
FIG. 7 is a flow diagram of a method for tuning performance of a microservices-based application, in accordance with another example embodiment of the invention.

FIG. 7 is a flow diagram of a method 700 for tuning performance of a microservices-based application, in accordance with an example embodiment of the invention. The various steps and/or operations of the flow diagram, and combinations of steps/operations in the flow diagram, may be implemented by, for example, hardware, firmware, a processor, circuitry and/or by a server system such as the server system 150 explained with reference to FIGS. 1 to 5B, and/or by a different electronic device associated with the execution of software that includes one or more computer program instructions. The method 700 starts at operation 702.

At 704, the method 700 includes receiving a trigger event. Some examples of the trigger event may include, but are not limited to, an occurrence of a vacancy created on a host after a termination or a movement of a microservice instance, an occurrence of an addition or a deletion of a host, a receipt of a user instruction to perform automatic tuning of the performance of the application, and the like. In some embodiments, a receipt of an indication like an alarm or alert message to perform pre-scheduled tuning of the performance of the application may serve as the trigger event for monitoring the plurality of traffic flows. Accordingly, any of such trigger events, may cause the server system to monitor the traffic flows.

At 706, the method 700 includes monitoring traffic flows for a predefined sampling period.

At 708, the method 700 includes identifying a traffic flow with highest total volume of communication.

At 710, the method 700 includes selecting a flow segment for the identified traffic flow. The flow segment with the highest individual volume of communication is selected.

At 712, the method 700 includes performing tuning of the selected flow segment. The tuning may be performed by determining if at least one microservice instance associated with the selected flow segment can be relocated, such that the volume of communication between the pair of microservice instances reduces or latency between hosts deploying the pair of microservice instances reduces. The determination may be performed as explained with reference to step 606 of the method 600 explained with reference to FIG. 6 and is not explained again herein.

At 714, the method 700 includes determining if all flow segments of the identified flow segment are tuned. If it is determined that all the flow segments of the identified traffic flow are tuned, then 716 is performed, else 718 is performed.

At 718, the method 700 includes selecting a flow segment from among remaining flow segments of the traffic flow with highest individual volume of communication. The method 700 thereafter repeats the steps 712 onwards till all the flow segments of the traffic flow are tuned.

At 716, it is determined whether all the traffic flows are tuned. If all the traffic flows are not tuned, then 720 is performed, else the method 700 ends at 722.

At 720, a traffic flow from among the remaining traffic flows with the highest total volume of communication is identified. The method 700 thereafter repeats the steps 710 onwards till all the traffic flows related to the application are tuned. The method 700 ends at 722.

Figure 8:
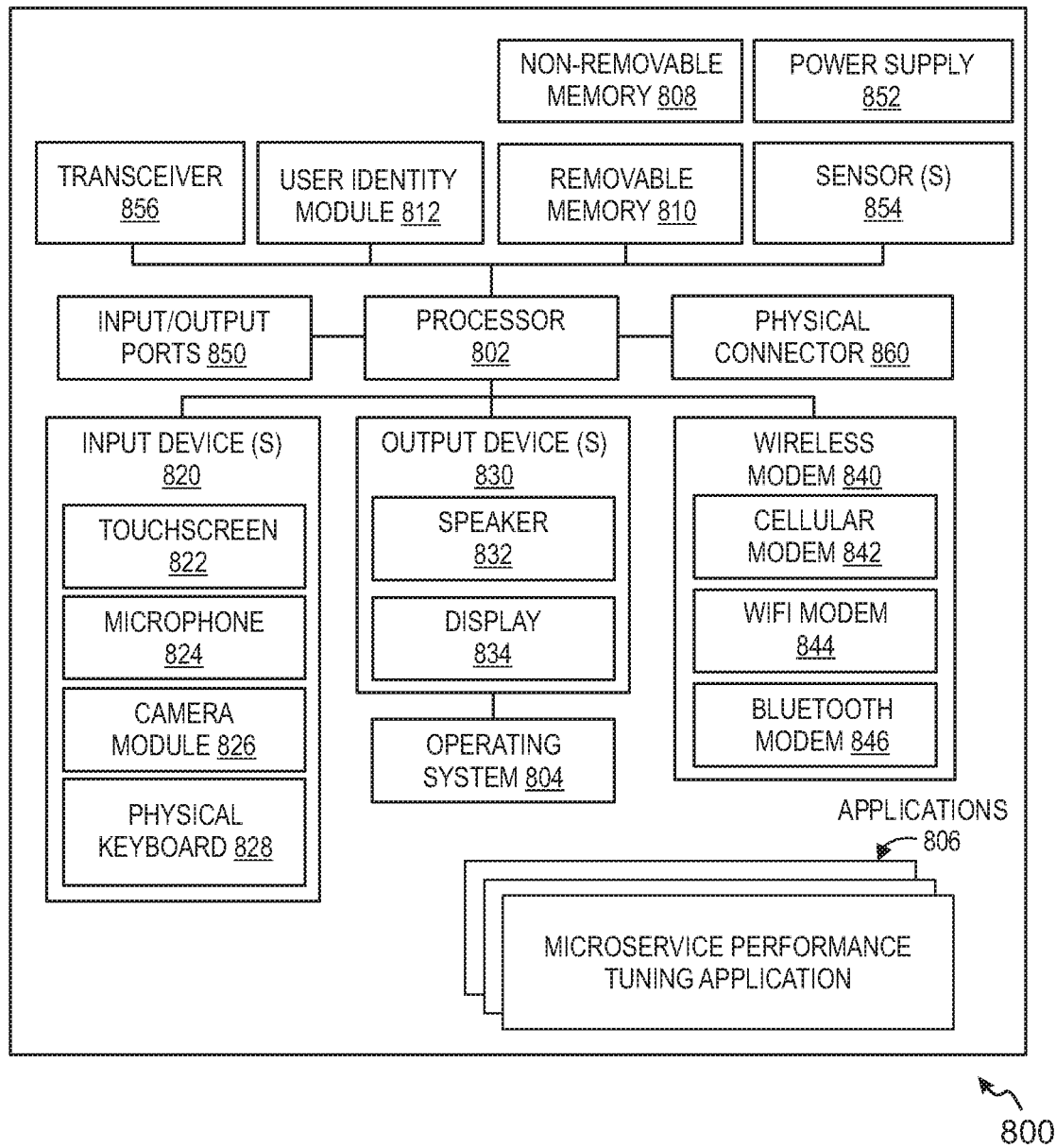
FIG. 8 shows a simplified block diagram of an electronic device, in accordance with an example embodiment of the invention.

FIG. 8 shows simplified block diagram of an electronic device 800, such as the electronic device 104 shown in FIG. 1. The electronic device 800, for example, can be a Smartphone or a tablet computer capable of implementing the various embodiments of the present invention. The electronic device 800 is depicted to include a plurality of applications 806 including a microservice performance tuning application.

It should be understood that the electronic device 800 as illustrated and hereinafter described is merely illustrative of one type of device and should not be taken to limit the scope of the embodiments. As such, it should be appreciated that at least some of the components described below in connection with that the electronic device 800 may be optional and thus in an example embodiment may include more, less or different components than those described in connection with the example embodiment of the FIG. 8. As such, among other examples, the electronic device 800 could be any of an electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 800 includes a controller or a processor 802 (e.g., a signal processor, microprocessor, ASIC, or other control and processing logic circuitry) for performing such tasks as signal coding, data processing, image processing, input/output processing, power control, and/or other functions. An operating system 804 controls the allocation and usage of the components of the electronic device 800 and support for one or more applications programs (for example, microservice performance tuning application), that implements one or more of the innovative features described herein. The applications 806 may include common mobile computing applications (e.g., telephony applications, email applications, calendars, contact managers, web browsers, messaging applications such as USSD messaging or SMS messaging or SIM Tool Kit (STK) application) or any other computing application. The microservice performance tuning application is configured to facilitate tuning performance of microservices-based applications as explained with reference to FIGS. 1 to 5B.

The illustrated electronic device 800 includes one or more memory components, for example, a non-removable memory 808 and/or a removable memory 810. The non-removable memory 808 and/or the removable memory 810 may be collectively known as database in an embodiment. In at least one example embodiment, the memory components of the electronic device 800 may be configured to store one or more machine learning algorithms for facilitating tracking patterns of traffic flows and predicting future traffic flows as explained with reference to FIG. 2.

The non-removable memory 808 can include RAM, ROM, flash memory, a hard disk, or other well-known memory storage technologies. The removable memory 810 can include flash memory, smart cards, or a Subscriber Identity Module (SIM). The one or more memory components can be used for storing data and/or code for running the operating system 804 and the applications 806. The electronic device 800 may further include a user identity module (UIM) 812. The UIM 812 may be a memory device having a processor built in. The UIM 812 may include, for example, a subscriber identity module (SIM), a universal integrated circuit card (UICC), a universal subscriber identity module (USIM), a removable user identity module (R-UIM), or any other smart card. The UIM 812 typically stores information elements related to a mobile subscriber. The UIM 812 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 800 can support one or more input devices 820 and one or more output devices 830. Examples of the input devices 820 may include, but are not limited to, a touch screen/a display screen 822 (e.g., capable of capturing finger tap inputs, finger gesture inputs, multi-finger tap inputs, multi-finger gesture inputs, or keystroke inputs from a virtual keyboard or keypad), a microphone 824 (e.g., capable of capturing voice input), a camera module 826 (e.g., capable of capturing still picture images and/or video images) and a physical keyboard 828. Examples of the output devices 830 may include, but are not limited to a speaker 832 and a display 834. The display 834 may be configured to display UIs, such as the UIs 500 and 550 shown in FIGS. 5A and 5B, respectively. Other possible output devices can include piezoelectric or other haptic output devices. Some devices can serve more than one input/output function. For example, the touch screen 822 and the display 834 can be combined into a single input/output device.

A wireless modem 840 can be coupled to one or more antennas (not shown in the FIG. 8) and can support two-way communications between the processor 802 and external devices, as is well understood in the art. The wireless modem 840 is shown generically and can include, for example, a cellular modem 842 for communicating at long range with the mobile communication network, a Wi-Fi compatible modem 844 for communicating at short range with an external Bluetooth-equipped device or a local wireless data network or router, and/or a Bluetooth-compatible modem 846. The wireless modem 840 is typically configured for communication with one or more cellular networks, such as a GSM network for data and voice communications within a single cellular network, between cellular networks, or between the electronic device 800 and a public switched telephone network (PSTN).

The electronic device 800 can further include one or more input/output ports 850, a power supply 852, one or more sensors 854, a transceiver 856 (for wirelessly transmitting analog or digital signals) and/or a physical connector 860, which can be a USB port, IEEE 1294 (FireWire) port, and/or RS-232 port. The illustrated components are not required or all-inclusive, as any of the components shown can be deleted and other components can be added.

Various example embodiments offer, among other benefits, techniques for managing applications on user devices that overcome above-mentioned obstacles and provide additional advantages. More specifically, techniques disclosed herein provide a method and system for tuning performance of microservices-based applications. The microservices are deployed in a manner that reduces a volume of traffic (in bytes), while ensuring that the network latencies between hosts are within prescribed limits, thereby tuning a performance of the microservices-based application to its optimum level. Moreover, the deployment of microservices in hosts based on the observed traffic flows is performed automatically without any manual intervention. Moreover, the automatic tuning of performance enables the microservices-based application to achieve optimum performance irrespective of variations in underlying systems and variations in usage patterns. Moreover, by precluding manual tuning of performance, over-provisioning of resources is avoided, thereby leading to cost savings and resource efficiencies.

Although the invention has been described with reference to specific exemplary embodiments, it is noted that various modifications and changes may be made to these embodiments without departing from the broad spirit and scope of the invention. For example, the various operations, modules, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the systems and methods may be embodied using transistors, logic gates, and electrical circuits (for example, application specific integrated circuit (ASIC) circuitry and/or in Digital Signal Processor (DSP) circuitry).

Particularly, the microservice performance tuning application and its various functionalities may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations (for example, operations explained herein with reference to FIGS. 6 and 7). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method for tuning a performance of an application, the application comprising a plurality of microservices, each microservice associated with one or more microservice instances, each microservice instance deployed on a host from among a plurality of hosts, the method comprising:

in response to a trigger event, monitoring for a predefined sampling period by a server system, a plurality of traffic flows associated with user requests related to the application, each traffic flow associated with respective total volume of communication among microservice instances in response to a user request, each traffic flow comprising at least one flow segment;

identifying, by the server system, a traffic flow associated with a highest total volume of communication from among the plurality of traffic flows;

for the identified traffic flow, selecting corresponding one or more flow segments in a decreasing order of respective individual volume of communication by the server system; and performing, by the server system for each selected flow segment:

identifying a pair of microservice instances associated with the flow segment, determining if at least one microservice instance from among the pair of microservice instances is capable of being relocated from a respective current host to another host for achieving at least one predetermined performance objective, and facilitating redeployment of the at least one microservice instance if the at least one microservice instance is capable of being relocated from the current host to the another host for achieving the at least one predetermined performance objective.

2. The method as claimed in claim 1, further comprising:

for remaining traffic flows from among the plurality of traffic flows, repeating by the server system, steps of identifying, selecting and performing for facilitating tuning of the performance of the application.

3. The method as claimed in claim 1, wherein determining if the at least one microservice instance is capable of being relocated comprises determining if the pair of microservice instances is capable of being collocated on a single host from among the plurality of hosts.

4. The method as claimed in claim 3, wherein determining if the at least one microservice instance is capable of being relocated comprises determining if the pair of microservice instances is capable of being relocated to a host pair with least latency subsequent to determining that the pair of microservice instances is incapable of being collocated on the single host.

5. The method as claimed in claim 1, wherein the trigger event corresponds to occurrence of one of:

a vacancy created on a host from among the plurality of hosts due to a termination or a movement of a microservice instance, an addition or a deletion of a host from among the plurality of hosts, a receipt of a user instruction to perform automatic tuning of the performance of the application, and an indication to perform pre-scheduled tuning of the performance of the application.

6. The method as claimed in claim 1, wherein determining if the at least one microservice instance is capable of being relocated from the respective current host to another host comprises evaluating:

a resource requirement of the at least one microservice instance and resource availability of the another host, one or more affinity and anti-affinity rules associated with the at least one microservice instance and with microservice instances currently deployed on the another host, and a change in baseline latency between hosts deploying the pair of microservice instances resulting from relocation of the at least one microservice instance from the respective current host to another host.

7. The method as claimed in claim 1, wherein communication between the pair of microservice instances corresponds to a hypertext transfer protocol (HTTP) based exchange of information.

8. The method as claimed in claim 1, wherein the at least one predetermined performance objective comprises at least one of:

an objective related to reducing a volume of communication between hosts deploying the pair of microservice instances, and an objective related to reducing a baseline latency between the hosts deploying the pair of microservice instances.

9. The method as claimed in claim 1, wherein facilitating the redeployment of the at least one microservice instance comprises:

causing a termination of the at least one microservice instance deployed on the respective current host;

causing an initiation of the at least one microservice instance on the another host subsequent to the termination of the at least one microservice instance deployed on the respective current host; and facilitating a registration of the at least one microservice instance deployed on another host for enabling discovery of the at least one microservice instance by remaining microservice instances associated with the application.

10. The method as claimed in claim 1, further comprising:

identifying, by the server system, at least one traffic flow pattern based on the monitoring of the plurality of traffic flows associated with the user requests related to the application; and predicting, by the server system, future traffic flows based on the identified at least one traffic flow pattern, wherein the tuning of the performance of the application is performed based, at least in part, on the prediction of the future traffic flows.

11. A server system for tuning a performance of an application, the application comprising a plurality of microservices, each microservice associated with one or more microservice instances, each microservice instance deployed on a host from among a plurality of hosts, the server system comprising:

at least one processing module; and a memory having stored therein machine executable instructions, that when executed by the at least one processing module, cause the server system to:

monitor for a predefined sampling period, in response to a trigger event, a plurality of traffic flows associated with user requests related to the application, each traffic flow associated with a respective total volume of communication among microservice instances in response to a user request, each traffic flow comprising at least one flow segment;

identify a traffic flow associated with a highest total volume of communication from among the plurality of traffic flows;

for the identified traffic flow, select corresponding one or more flow segments in a decreasing order of respective individual volume of communication; and perform for each selected flow segment:
identifying a pair of microservice instances associated with the flow segment,
determining if at least one microservice instance from among the pair of microservice instances is capable of being relocated from a respective current host to another host for achieving at least one predetermined performance objective, and
facilitating redeployment of the at least one microservice instance if the at least one microservice instance is capable of being relocated from the current host to another host for achieving the at least one predetermined performance objective.

12. The server system as claimed in claim 11, wherein the server system is further caused to:
repeat steps of identifying, selecting and performing for remaining traffic flows from among the plurality of traffic flows for facilitating tuning of the performance of the application.

13. The server system as claimed in claim 11, wherein determining if the at least one microservice instance is capable of being relocated comprises determining if the pair of microservice instances is capable of being collocated on a single host from among the plurality of hosts.

14. The server system as claimed in claim 13, wherein determining if the at least one microservice instance is capable of being relocated comprises determining if the pair of microservice instances is capable of being relocated to a host pair with least latency subsequent to determining that the pair of microservice instances is incapable of being collocated on the single host.

15. The server system as claimed in claim 11, wherein the trigger event corresponds to occurrence of one of:
a vacancy created on a host from among the plurality of hosts subsequent to a termination or movement of a microservice instance,
an addition or a deletion of a host from among the plurality of hosts,
a receipt of a user instruction to perform automatic tuning of the performance of the application, and
an indication to perform pre-scheduled tuning of the performance of the application.

16. The server system as claimed in claim 11, wherein determining if the at least one microservice instance is capable of being relocated from the respective current host to another host comprises evaluating:
a resource requirement of the at least one microservice instance and resource availability of the another host,
one or more affinity and anti-affinity rules associated with the at least one microservice instance and with microservice instances currently deployed on the another host, and
a change in baseline latency between hosts deploying the pair of microservice instances resulting from relocation of the at least one microservice instance from the respective current host to another host.

17. The server system as claimed in claim 11, wherein facilitating the redeployment of the at least one microservice instance comprises:
causing a termination of the at least one microservice instance deployed on the respective current host;
causing an initiation of the at least one microservice instance on the another host subsequent to the termination of the at least one microservice instance deployed on the respective current host; and
facilitating a registration of the at least one microservice instance deployed on another host for enabling discovery of the at least one microservice instance by remaining microservice instances associated with the application.

18. The server system as claimed in claim 11, wherein the server system is further caused to:
identify at least one traffic flow pattern based on the monitoring of the plurality of traffic flows associated with the user requests related to the application; and
predict future traffic flows based on the identified at least one traffic flow pattern, wherein the tuning of the performance of the application is performed based, at least in part, on the prediction of the future traffic flows.

19. A method for tuning a performance of an application, the application comprising a plurality of microservices, each microservice associated with one or more microservice instances, each microservice instance deployed on a host from among a plurality of hosts, the method comprising:
in response to a trigger event, monitoring for a predefined sampling period by a server system, a plurality of traffic flows associated with user requests related to the application, each traffic flow associated with a respective total volume of communication among microservice instances in response to a user request, each traffic flow comprising at least one flow segment;
identifying, by the server system, a traffic flow associated with a highest total volume of communication from among the plurality of traffic flows;
for the identified traffic flow, selecting corresponding one or more flow segments in a decreasing order of respective individual volume of communication by the server system; and
performing, by the server system, for each selected flow segment:
identifying a pair of microservice instances associated with the flow segment,
determining if the pair of microservice instances is capable of being collocated on a single host from among the plurality of hosts for achieving at least one predetermined performance objective,
determining if the pair of microservice instances is capable of being relocated to a host pair with least latency subsequent to determining that the pair of microservice instances is incapable of being collocated on the single host, and
facilitating redeployment of the at least one microservice instance based on the determination of relocation of the pair of microservice instances for achieving the at least one predetermined performance objective.

20. The method as claimed in claim 19, wherein the at least one predetermined performance objective comprises at least one of:
an objective related to reducing a volume of communication between hosts deploying the pair of microservice instances, and
an objective related to reducing a communication latency between the hosts deploying the pair of microservice instances.

* * * * *